United States Patent Office

3,822,244
Patented July 2, 1974

3,822,244
PROCESS FOR THE CROSSLINKING
OF POLYSTYRENE
Jean Peyrot, Le Havre, France, assignor to Compagnie
Francaise de Raffinage, Paris, France
No Drawing. Filed Feb. 11, 1972, Ser. No. 225,623
Claims priority, application France, Feb. 15, 1971,
7105040
Int. Cl. C08f 7/04, 27/02
U.S. Cl. 260—93.5 A                                8 Claims

ABSTRACT OF THE DISCLOSURE

Process, and product of the type resulting therefrom, of crosslinking polystyrene to give a solid non-gelatinous product preferably of approximately the same particle size as the original non-crosslinked polystyrene, derived by chloromethylation of at least a part of the benzene rings of the polystyrene macromolecule by means of chloromethyl methyl ether, followed by methane bridge crosslinking resulting from dehydrochlorination, all carried out in the presence of a nonsolvent for polystyrene (being a solvent for the chloromethyl methyl ether) and a Friedel-Crafts catalyst and where the concentration of the chloromethyl methyl ether in the said nonsolvent is at any given moment less than that which would cause the polystyrene in the reaction to change size either by agglomeration of particles or by going into solution (to any significant degree).

---

The present invention relates to thermoplastic homopolymers; more particularly it concerns a process for the crosslinking of polystyrene.

It is known that polystyrene is soluble in esters, aromatic hydrocarbons and chlorinated hydrocarbons, which greatly limits its applications, but it is posible by crosslinking it to make it insoluble in these compounds.

The crosslinking of polystyrene is ordinarily effected by copolymerization of styrene and divinyl benzene. Nevertheless it is very difficult to control the particle size of the copolymer which is obtained by this process. Particle size is an important characteristic in a number of applications of crosslinked polystyrene and in particular in its application to ion exchange resins. It is particularly advantageous to be able to retain the particle size of the polystyrene to be crosslinked from which one starts, which is not possible by this foregoing prior art process.

Another process of crosslinking polystyrene consists of effecting the chloromethylation of at least a part of the benzene rings of the polystyrene and then the dehydrochlorination in a Friedel-Crafts type reaction by removal of the chlorine atom located on the methylene radical and of a hydrogen atom belonging to a benzene ring of a polystyrene macromolecule. Nevertheless this process has up to now led only to gels.

An object of the present invention is to crosslink polystyrene and obtain a product of given particle size by simple means.

The process developed by the applicant makes it possible in particular to retain the particle size of the polystyrene used as starting material.

One embodiment of the present invention is a method of crosslinking polystyrene by catalytic chloromethylation of benzene rings of the polystyrene macromolecules by means of chloromethyl methyl ether, followed by a dehydrochlorination by removal of chlorine atoms located on the methylene radicals and of hydrogen atoms located on the benzene rings. Said method being characterized by the fact that it is carried out in the presence of a Friedel-Crafts catalyst and of a nonsolvent for the polystyrene, and by the fact that the concentration of chloromethyl methyl ether in the said nonsolvent is at a given moment less than the maximum solubility concentration of polystyrene at the temperature in question, the polystyrene being crosslinked to a greater or lesser extent depending upon the moment in question.

By "maximum solubility concentration of polystyrene" is meant the concentration of chloromethyl methyl ether in the liquid medium beyond which the particle size of the polystyrene present in the reaction medium undergoes changes as compared with the particle size of the polystyrene to be crosslinked either by agglomeration of particles or by their passage into solution.

Another embodiment of the present invention consists of the crosslinked polystyrene which is obtained by using the process described above, said crosslinked polystyrene being characterized by the fact that its particle size is identical to that of the polystyrene prior to crosslinking, and by the fact that its specific surface is equal to or greater than 2 m.$^2$/g.

The chloromethylation and dehydrochlorination reactions take place one after the other with respect to the macromolecules, but simultaneously with respect to the process. They are carried out in the same enclosure and with the same catalyst; namely a Friedel-Crafts catalyst, such as $SnCl_4$ or $AlCl_3$ or $ZnCl_2$, for example.

This invention in part resulted from a discovery of the applicant, who found that the appearance of gels upon the crosslinking is related to the placing in solution—but only partial placing in solution—of the polystyrene. It is known that chloromethyl methyl ether is a solvent for polystyrene and that crosslinked polystyrene is less soluble in chloromethyl methyl ether the greater its crosslinking. The solubility of the polystyrene depends therefore on the one hand on the temperature of the crosslinking reaction (the higher the temperature the greater the solubility) and on the other hand on the degree of crosslinking of the polystyrene (the higher this degree the less the solubility). However, the presence of a minimum concentration of chloromethyl methyl ether is necessary, if it is desired to obtain a velocity of chloromethylation, and thus of crosslinking, which is not too low.

The concentration of chloromethyl methyl ether should be the lowest during the initial period of the crosslinking of the polystyrene; then, as the crosslinking index increases, one can either increase the temperature of the reaction continuously or intermittently, or increase the concentration of chloromethyl methyl ether continuously or intermittently, or else vary these two parameters simultaneously.

The liquid medium to which the chloromethyl methyl ether is added must be both a nonsolvent for the polystyrene and a solvent for the chloromethyl methyl ether. Moreover, it must not destroy or complex the catalyst. Saturated aliphatic hydrocarbons, hexane or heptane for instance, can be used.

The addition of a Friedel-Crafts catalyst such as $SnCl_4$ permits the dehydrochlorination to take place at the same time as the chloromethylation reaction is produced by a reaction of the Friedel-Crafts type. The reactions can be indicated schematically as follows:

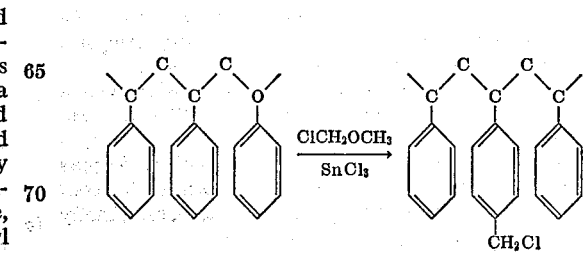

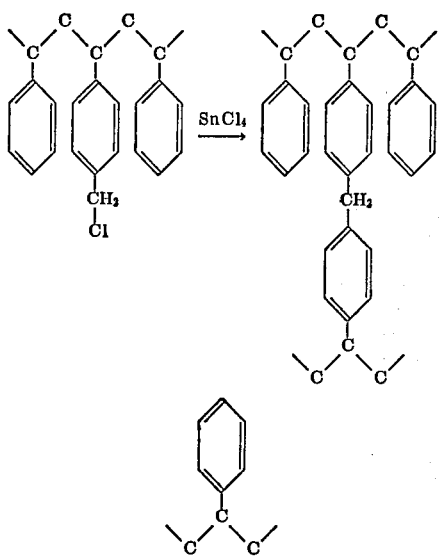

One embodiment of the invention consists in effecting the crosslinking of the polystyrene at room temperature. The applicant has found that at this temperature the concentration of chloromethyl methyl ether should not be greater than 10% by volume of the nonsolvent for the polystyrene during the initial period of crosslinking. Thereupon the concentration can be increased or the temperature elevated, or both of them can be increased simultaneously.

The following examples which are given by way of illustration and not of limitation, will serve to make the invention clearer.

EXAMPLE I

Beads of polystyrene having a diameter of between 0.2 and 0.5 mm. are used.

The molecular weights of the polystyrene, determined by gel chromatography, are as follows: $\overline{M}_w = 288,000$, $\overline{M}_n = 108,000$.

1 cc. of $SnCl_4$ catalyst is introduced with agitation into a mixture of 10 grams of polystyrene, 200 cc. of heptane and 16 cc. of chloromethyl methyl ether. The mixture is maintained for four hours at room temperature (20° C.) under an inert atmosphere (nitrogen).

The product obtained is washed in succession with a 30% aqueous dioxan solution containing 10% concentrated hydrochloric acid and then with a 30% aqueous solution of pure dioxan and then with solutions formed of mixtures of dioxan and methanol in which the concentration of the methanol gradually increases. Finally a washing with pure methanol is effected.

The product is then subjected to a benzene extraction for five hours.

The reaction conditions (concentration of $ClCH_2OCH_3$, time), as well as the characteristics of the crosslinked polystyrene obtained are set forth in Table 1 below.

TABLE 1

| Test | Concentration $ClCH_2OCH_3$ (percent by volume) | Time (hrs.) | Swelling ratio [a] | $N_c$ [b] | Specific surface (m.²/g.) |
| --- | --- | --- | --- | --- | --- |
| 1 | 8 | 4 | 6.79 | 8,260 | 4 |

[a] Ratio of the weight of the crosslinked polystyrene swollen in benzene to the weight of the dry crosslinked polystyrene.
[b] Molecular weight between two crosslinking points (two bridges), calculated on basis of Flory's formula.

It is noted that an 8% heptane solution of chlormethyl methyl ether at a temperature of 20° C. leads to a crosslinked polystyrene.

There is also noted the appearance of a substantial specific surface. By way of comparison, the specific surface of the polystyrene beads to be crosslinked is reduced to the geometrical surface of these beads.

EXAMPLE II

In Tests 2 and 3, the concentration of the chloromethyl methyl ether was increased in succession two times. The first crosslinking stage was effected at a temperature of 20° C. with a concentration of chloromethyl methyl ether of less than or equal to 8%. The temperature was maintained equal to 20° C. in the second and third crosslinking stages.

The products obtained were subjected to washings and then to an extraction in accordance with the methods described in Example I.

The results of these tests are entered in Table 2 below.

TABLE 2

| Test | First stage | | Second stage | | Third stage | | Swelling ratio | $M_c$ | Specific surface (m.²/g.) | Chlorine, wt. percent |
| --- | --- | --- | --- | --- | --- | --- | --- | --- | --- | --- |
| | Concentration $ClCH_2OCH_3$ (percent by vol.) | Time (hrs.) | Concentration $ClCH_2OCH_3$ (percent by vol.) | Time (hrs.) | Concentration $ClCH_2OCH_3$ (percent by vol.) | Time (hrs.) | | | | |
| 1 | 8 | 4 | 0 | 0 | 0 | 0 | 6.79 | 8,260 | 4 | 4.5 |
| 2 | 8 | 2 | 16 | 2 | 24 | 2 | 6.52 | 7,660 | 2 | 7.4 |
| 3 | 2 | 2 | 8 | 2 | 22 | 2 | 3.86 | 2,770 | 2 | 7.5 |

EXAMPLE III

In Tests 4, 5, 6 and 7, the temperature and the chloromethyl methyl ether concentration were increased after a first crosslinking step at a temperature of 20° C. The temperature of the second step is 60° C.

The products obtained are subjected to washings and then to an extraction in accordance with the methods described in Example I.

The results of these tests have been set forth in Table III below.

TABLE 3

| Test | First step at 20° C. | | Second step at 60° C. | | Swelling ratio | $M_c$ | Specific surfac (m.²/g.) | Chlorine (wt.) percent |
| --- | --- | --- | --- | --- | --- | --- | --- | --- |
| | Concentration $ClCH_2OCH_3$ (vol. percent) | Time (hrs.) | Concentration $ClCH_2OCH_3$ (vol. percent) | Time (hrs.) | | | | |
| 1 | 8 | 4 | 0 | 0 | 6.79 | 8,260 | 4 | 4.5 |
| 4 | 4 | 4 | 10 | 4 | 2.47 | 1,060 | 2 | 9.8 |
| 5 | 4 | 4 | 20 | 4 | 1.92 | 570 | 7 | 13 |
| 6 | 8 | 4 | 10 | 4 | 1.72 | 420 | 4 | 16.6 |
| 7 | 8 | 4 | 20 | 4 | 1.74 | 435 | 4 | 19.6 |

Examples II and III show that it is possible to obtain the desired crosslinking index for the polystyrene and that this index may be very large. The process of the invention makes it possible to preserve the particle size of the initial polystyrene. Furthermore a permanent porosity appears upon the crosslinking.

The quantity of chlorine present in the crosslinked polystyrene increases with the crosslinking indices.

EXAMPLE IV

This example does not fall within the scope of the process of the invention but is intended to justify the 10% limit which has been established for the concentration of chloromethyl methyl ether upon the first crosslinking at a temperature of 20° C.

Polystyrene beads identical to those described in Example I are used. These beads therefore have a diameter of between 0.2 and 0.5 mm.

0.5 cc. of SnCl₄ catalyst is introduced with agitation into a mixture of 5 grams of polystyrene, 100 cc. of heptane and 10 cc. (in Test 8) and 12 cc. (in Test 9) respectively of chloromethyl methyl ether. The mixture is maintained for three hours at room temperature (20° C.) in an inert atmosphere (nitrogen).

The products obtained are washed and extracted in accordance with the methods described in Example I. They are then dried.

The crosslinked polystyrene is then screened to show the changes in the particle size as compared with the particle size of the initial polystyrene used for the cross-linking. The results are set forth in Table 4.

TABLE 4

| Test | Crosslinking at 20° C. | | Particle size (percent particles of a diameter of more than 0.5 mm.) | |
|---|---|---|---|---|
| | Concentration ClCH₂OCH₃ (by volume) | Time (hrs.) | Before crosslinking | After crosslinking |
| 8 | 10 | 3 | 0 | 29 |
| 9 | 12 | 3 | 0 | 85 |

The modification of the particle size is effected by agglomeration of the particles. It is found therefore that one should not exceed a concentration of 10% (at a temperature of 20° C.) dring the initial period of the cross-linking if one wishes to retain the particle size of the initial polystyrene.

The figure of 10% furthermore constitutes a maximum since, for this value of the concentration, 29% of the crosslinked polystyrene consists of particles of a diameter of more than 0.5 mm., while the particle size of the polystyrene crosslinked with a concentration of 8% chloromethyl methyl ether is unchanged when the crosslinking temperature is 20° C.

I claim:
1. A process for obtaining, from polystyrene, non-gelatinous, cross-linked particles of polystyrene having particle sizes substantially similar to that of the original polystyrene, said process comprising:
 (a) chloromethylating at least a part of the benzene rings of the polystyrene macromolecules with chloromethyl methyl ether, the concentration of which is at any given moment during the process less than the maximum solubility concentration of polystyrene present at such moment in the reaction medium at the then current temperature of the reaction, to avoid dissolving or gelling of the polystyrene or any substantial change in the particle size of the polystyrene present from its original particle size;
 (b) dehydrochlorinating in situ the chloromethylated polystyrene chains with the removal of chlorine atoms located on the methylene radicals and of hydrogen atoms located on part of the non-chlorinated benzene rings, in presence of a Friedel-Crafts catalyst,
said chloromethylation and dehydrochlorination being both carried out in the presence of a non-solvent means, which is a non-solvent for the polystyrene, but which is a solvent for the chloromethyl methyl ether, and which is compatible with the Friedel-Crafts catalyst, said non-solvent means being a saturated aliphatic hydrocarbon.

2. A process for obtaining, from polystyrene, non-gelatinous, cross-linked particles of polystyrene having particle sizes substantially similar to that of the original polystyrene, said process comprising:
 (a) chloromethylating at least a part of the benzene rings of the polystyrene macromolecules with chloromethyl methyl ether, the concentration of which is at any given moment during the process less than the maximum solubility concentration of polystyrene present at such moment in the reaction medium at a temperature close to 20° C., to avoid dissolving or gelling of the polystyrene or any substantial change in the particle size of the polystyrene present from its original particle size;
 (b) dehydrochlorinating in situ the chloromethylated polystyrene chains with the removal of chlorine atoms located on the methylene radicals and of hydrogen atoms located on part of the non-chlorinated benzene rings, in presence of a Friedel-Crafts catalyst,
said chloromethylation and dehydrochlorination being both carried out in the presence of a non-solvent means, which is a non-solvent for the polystyrene, but which is a solvent for the chloromethyl methyl ether, and which is compatible with the Friedel-Crafts catalyst, said non-solvent means being a saturated aliphatic hydrocarbon, the initial concentration of chloromethyl methyl ether being at the most approximately 10% by volume of the non-solvent means.

3. A process according to Claim 1, wherein said solvent means is chosen from the group consisting of heptane and hexane.

4. A process according to Claim 2, wherein said solvent means is chosen from the group consisting of heptane and hexane.

5. A process according to Claim 1, wherein the concentration of the chloromethyl methyl ether is increased as the degree of cross-linking of the polystyrene increases, but remains less than would result in the dissolving or agglomeration of the polystyrene.

6. A process according to Claim 2, wherein the concentration of the chloromethyl methyl ether is increased as the degree of cross-linking of the polystyrene increases, but remains less than would result in the dissolving or agglomeration of the polystyrene.

7. A process according to Claim 1, wherein the temperature is increased as the degree of cross-linking of the polystyrene increases, but remains below the dissolution temperature of the polystyrene in the chloromethyl methyl ether present in the reaction medium.

8. A process according to Claim 2, wherein the temperature is increased as the degree of cross-linking of the polystyrene increases, but remains below the dissolution temperature of the polystyrene in the chloromethyl methyl ether present in the reaction medium.

References Cited

UNITED STATES PATENTS 2,694,702  11/1954  Jones _____ 260—93.5 A

JAMES A. SEIDLECK, Primary Examiner

U.S. Cl. X.R.

260—96 HA